United States Patent [19]

Tomiyori et al.

[11] Patent Number: 5,391,928
[45] Date of Patent: Feb. 21, 1995

[54] SWITCHING CIRCUIT HAVING A REDUCED OUTPUT IMPEDANCE

[75] Inventors: Yutaka Tomiyori, Tokyo; Hidetoshi Takenaka, Saitama, both of Japan

[73] Assignee: NEC Corporation, Tokyo, Japan

[21] Appl. No.: 804,938

[22] Filed: Dec. 11, 1991

[30] Foreign Application Priority Data

Dec. 14, 1990 [JP] Japan .................................. 2-410997

[51] Int. Cl.6 .......................... H01H 3/16; H04M 1/00
[52] U.S. Cl. .......................................... 307/89; 307/99; 307/115; 379/424
[58] Field of Search .................. 307/89, 98–100, 307/115, 130, 134, 139, 140; 333/12, 24 C; 379/422, 424, 426, 394, 417, 416

[56] References Cited

U.S. PATENT DOCUMENTS

| | | | |
|---|---|---|---|
| Re. 32,278 | 11/1986 | Yokota et al. | 307/130 |
| 1,824,857 | 9/1931 | Wintringham | 307/134 |
| 3,925,682 | 12/1975 | Hamada | 307/134 |
| 4,057,691 | 11/1977 | Goto et al. | 379/417 X |
| 5,073,924 | 12/1991 | Frisby | 379/394 |

*Primary Examiner*—A. D. Pellinen
*Assistant Examiner*—Fritz M. Fleming
*Attorney, Agent, or Firm*—Foley & Lardner

[57] ABSTRACT

In a switching circuit for use in a mobile telephone device in controllably transmitting a speech signal to a radio transmission unit through an output terminal (312), a first switch (31) is controlled by a control signal which is supplied to a control terminal (32) with a high level and a low level of putting the first switch in a conductive and a non-conductive state when a second switch (36) is put in its off and on states. A capacitor (35) is connected between the control terminal and the output terminal in order to make the switching circuit have a low output impedance when the first switch is put in its off state.

7 Claims, 1 Drawing Sheet

SWITCHING CIRCUIT HAVING A REDUCED OUTPUT IMPEDANCE

BACKGROUND OF THE INVENTION

This invention relates to a switching circuit which is for use in a mobile telephone device.

The mobile telephone device comprises a telephone unit and a radio transmission unit. The telephone unit comprises a first CPU and a first audio circuit. The radio transmission unit comprises a second CPU and a second audio circuit. A data line is connected between the first CPU and the second CPU. The switching circuit is connected to the first audio circuit. A speech signal transmission line is connected between the switching circuit and the second audio circuit.

A conventional switching circuit is an analog switch. The analog switch has an input terminal supplied with a speech signal from the first audio circuit and an output terminal for supplying the speech signal to the audio signal transmission line. When put in a conductive state, the analog switch switches each of the first and the second audio circuits to an active state. When put in a non-conductive state, the analog switch switches each of the first and the second audio circuit to an inactive state.

As will later be described more in detail, the speech signal transmission line is inevitably capacitively coupled to the data line. As a result, the conventional switching circuit is defective in that the switching circuit has an objectionably high output impedance when the analog switch is in the non-conductive state.

From a different point of view, a conventional switching circuit has an input terminal supplied with a speech signal and an output terminal connected to a speech signal transmission line. The switching circuit is for switching the speech signal transmission line to an active state and an inactive state. When put in the active state, the speech signal transmission line receives the speech signal. When put in the inactive state, the speech signal transmission line does not receive the speech signal.

In the manner pointed out hereinabove, the speech signal transmission line is inevitably subjected to capacitive coupling to the data line. Being a simple analog switch, the conventional switching circuit has an objectionably high impedance when put in a non-conductive state. In this state, the speech signal transmission line is undesireably supplied through the capacitive coupling with signals which are transmitted through the data line in the meantime.

SUMMARY OF THE INVENTION

It is therefore an object of the present invention to provide a switching circuit having a reduced output impedance.

On describing the gist of an aspect of this invention, it is possible to understand that a switching circuit is for use in combination with an audio circuit of a telephone device and has an input and an output terminal connected to the audio circuit for switching the audio circuit to an active state and an inactive state.

According to the above-described aspect of this invention, the above-understood switching circuit comprises: a first switch connected between the input and the output terminals and having a control terminal supplied with a control signal which has a high level and a low level for putting the first switch in a conductive state and a non-conductive state in accordance with the high and the low levels of the control signal; a resistor connected to the control terminal; power source means for supplying electric power to the control terminal through the resistor; a capacitor connected between the control terminal and the output terminal; and a second switch connected between the control terminal and ground for switching the control signal between the high level and the low level.

On describing a different aspect of this invention, it is possible to understand that a switching circuit has an input terminal supplied with a speech signal and an output terminal connected to a speech signal transmission line and is for switching the speech signal transmission line to an active and an inactive state in which the speech signal is supplied and is not supplied to the speech signal transmission line, respectively.

According to the different aspect of this invention, the above-understood switching circuit comprises: a first switch connected between the input and the output terminals and having a control terminal supplied with a control signal, which has a high level and a low level, for putting the first switch in a conductive state and a non-conductive state in accordance with the high and the low levels of the control signal; a resistor connected to the control terminal; power source means for supplying electric power to the control terminal through the resistor; a capacitor connected between the control terminal and the output terminal; and a second switch connected between the control terminal and ground for switching the control signal between the high level and the low level.

DESCRIPTION OF THE PREFERRED EMBODIMENT

Figure 1:
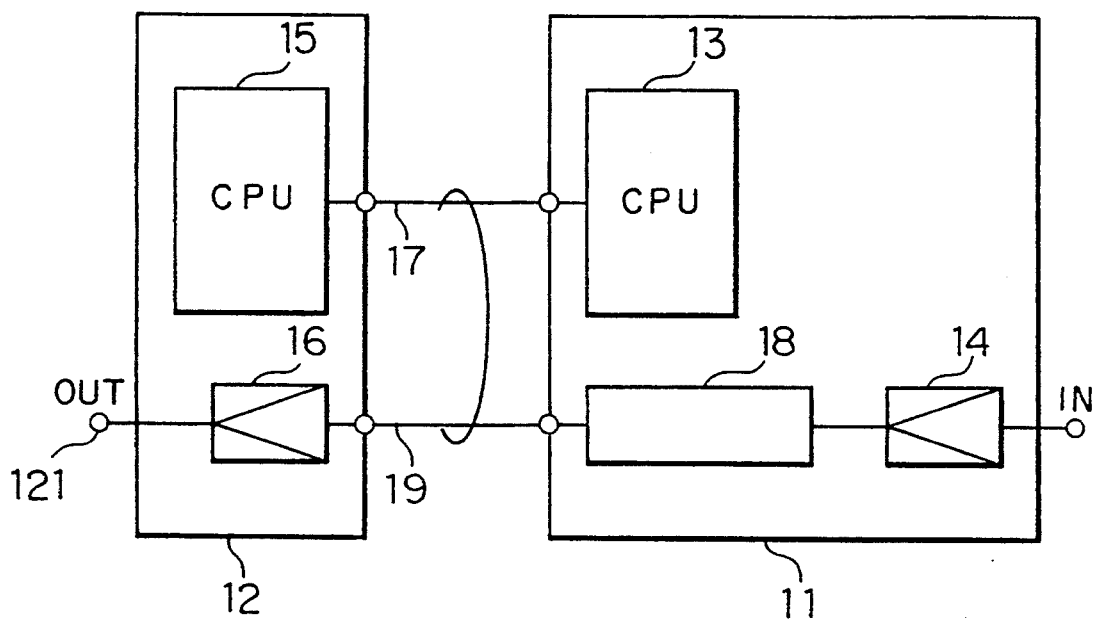
FIG. 1 is a block diagram of a mobile telephone device in which it is possible to use a switching circuit according to the instant invention.
Figure 2:
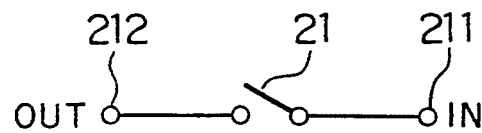
FIG. 2 is a circuit diagram of a conventional switching circuit.

Referring to FIGS. 1 and 2, a conventional switching circuit will be described at first in order to facilitate an understanding of the present invention.

In FIG. 1, the mobile telephone device comprises a telephone unit 11 and a radio transmission unit 12. The telephone unit 11 comprises a first CPU 13 and a first operational amplifier 14 which serves as a first audio circuit. The radio transmission unit 12 comprises a second CPU 15 and a second operational amplifier 16 for use as a second audio circuit. A data line 17 is connected between the first CPU 13 and the second CPU 15. A switching circuit 18 is connected to the first operational amplifier 14. A speech signal transmission line 19 is connected between the switching circuit 18 and the second operational amplifier 16 for transmission of a speech signal.

The telephone unit 11 is usually set on a console (not shown) of an automobile. The radio transmission unit 12 is placed usually in a trunk (not shown) of the automobile. The data line 17 and the speech signal transmission line 19 are ordinarily placed in a cable to extend parallel a long distance. Thus, the data line 17 and the speech signal transmission line 19 are inevitably capacitively coupled to each other.

In FIG. 2, the conventional switching circuit is an analog switch 21. For example, the analog switch 21 is used as a hook switch of a handset or as a hook switch used in combination with a cradle. It should be noted that a combination of the first operational amplifier 14 and the switch 18 shows the handset. Alternatively, the first CPU 13 and the switching circuit 18 are situated in the cradle. As a consequence, the cradle is depicted as a combination of the first CPU 13 and the switching circuit 18.

The analog switch 21 has an input terminal 211 supplied with the speech signal from the first operational amplifier 14 and an output terminal 212 for supplying the speech signal to the speech signal transmission line 19. The analog switch 21 has a conductive state and a non-conductive state.

When put in the conductive state, the analog switch 21 switches the first and the second operational amplifiers 14 and 16 to the active state. When put in the non-conductive state, the analog switch 21 puts the first and the second operational amplifiers 14 and 16 to the inactive state. When put in the non-conductive state, the analog switch 21 has a very high output impedance. The second operational amplifier 16 accordingly has a high input impedance. The speech signal transmission line 19 is undesireably supplied through capacitive coupling with data signals which are transmitted through the data line. The data signals are transmitted to an output terminal 121 of the radio transmission unit 12. As a result, the conventional switching circuit is defective in that the switching circuit has an objectionably high output impedance when the analog switch 21 is put in the non-conductive state.

In order to reduce the output impedance of the switching circuit 18, a capacitor may be connected between the output terminal 212 and ground. This, however, causes reduction of an input impedance of the switching circuit 18. The reduction of the input impedance influences frequency characteristics of the speech signal.

Figure 3:
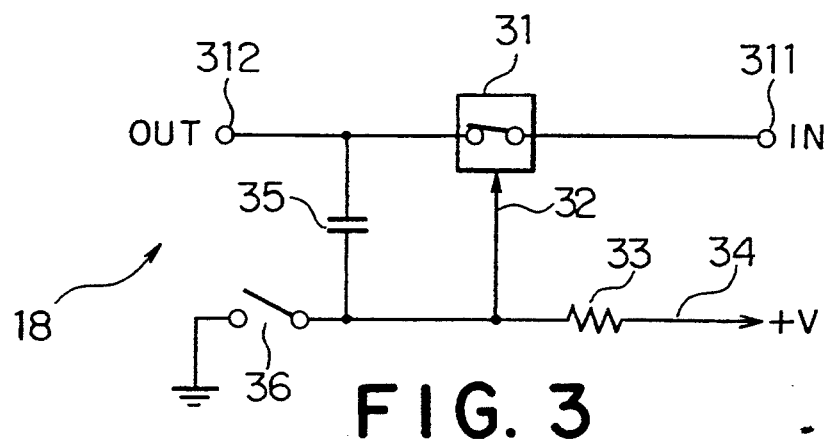
FIG. 3 is a circuit diagram of a switching circuit according to an embodiment of this invention.

Referring to FIG. 3 with FIG. 1 again referred to, the description will proceed to a switching circuit 18 according to a preferred embodiment of this invention. The switching circuit 18 is for use in combination with the first audio circuit 14 of the telephone device 11 and has a switch input terminal 311 connected to the first audio circuit 14 for switching the audio circuit 14 to an active state and an inactive state and a switch output terminal 312 for connection to the speech signal transmission line 19.

The switching circuit comprises a first switch 31 connected between the input and the output terminals 311 and 312 and having a control terminal 32 supplied with a control signal which has a high voltage level and a low voltage level putting the first switch 31 in a conductive state and a non-conductive state, respectively.

A resistor 33 is connected to the control terminal 32. A power source line 34 supplies electric power of a voltage +V to the resistor 33. A capacitor 35 is connected between the control terminal 32 and the output terminal 312. A second switch 36 is connected between the control terminal 32 and ground for switching the control signal between the high voltage level and the low voltage level. The second switch 36 is used as the hook switch of the handset or as the hook switch used in combination with the cradle.

When the second switch 36 is put in a non-conductive state, the power source line 34 supplies the voltage tv to the control terminal 32 through the resistor 33. The control signal puts the switch 31 in the conductive state. In this event, the speech signal is transmitted from the telephone unit 11 to the radio transmission unit 12 with no influence introduced into frequency characteristics of the speech signal. This is because the switching circuit 18 has a high input impedance.

When the second switch 36 is put in a conductive state, the control signal is connected to ground, thus putting the first switch 31 in the non-conductive state. In this case, the switching circuit 18 has a low or reduced impedance. The signals which are supplied to the speech signal transmission line 19 through the capacitive coupling is transmitted to ground through the capacitor 35 and the second switch 36.

Generally, the car-mounted telephone comprises a microphone (not shown) connected to the input terminal of the second operational amplifier 16. The input terminal of the second operational amplifier 16 is connected to the speech signal transmission line 19. The microphone is used in a hands-free talk mode. When the microphone is used, the handset is on hook and thereby the second switch 36 is closed. Thus, the signals which are supplied to the speech signal transmission line 19 through the capacitive coupling is not transmitted to the second operational amplifier 16.

What is claimed is:

1. A mobile telephone device comprising:
   a switching circuit connected to an audio circuit and having an input and an output terminal connected to said audio circuit for switching said audio circuit to an active state and an inactive state, and wherein said switching circuit includes,
      a first switch connected between said input and said output terminals and having a control terminal supplied with a control signal, said control signal having a high level voltage and a low level voltage putting said first switch in a conductive state and a non-conductive state, respectively;
      a resistor connected to said control terminal;
      a power source supplying electric power to said control terminal through said resistor;
      a capacitor connected between said control terminal and said output terminal; and
      a second switch connected between said control terminal and ground for switching said control signal between said high level voltage and said low level voltage.

2. A mobile telephone device as claimed in claim 1, wherein
   said second switch is said hook switch of a handset of said mobile telephone device.

3. A mobile telephone device as claimed in claim 1, wherein
   said second switch is a hook switch attached to a cradle of a mobile telephone device.

4. A mobile telephone device comprising:
   a switching circuit having an input terminal supplied with a speech signal and an output terminal connected to a speech signal transmission line for switching said speech signal transmission line for switching said speech signal transmission line to an active and an inactive state in which said speech signal is supplied and is not supplied to said speech signal transmission line, respectively, and wherein said switching circuit includes, a first switch connected between said input and said output terminals and having a control terminal supplied with a control signal which has a high level voltage and a low level voltage putting said first switch in a conductive state and a non-conductive state, respectively;

a resistor connected to said control terminal;

power source means for supplying electric power to said control terminal through said resistor;

a capacitor connected between said control terminal and said output terminal; and a second switch connected between said control terminal and ground for switching said control signal between said high level voltage and said low level voltage.

5. A mobile telephone device as claimed in claim 4, wherein
said second switch is a hook switch of a handset of said mobile telephone device.

6. A mobile telephone device as claimed in claim 4, wherein
said second switch is a hook switch of a cradle attached to said mobile telephone device.

7. A method of switching an audio circuit of a mobile telephone device, comprising the steps of:

closing a first switch and opening a second switch to supply a speech signal from said audio circuit to a speech transmission line while applying a first level voltage to a control terminal of said first switch to close said first switch through a resistor, said speech transmission line being adjacent to a data line of said device; and closing said second switch and opening said first switch while applying a second level voltage to said control terminal to open said first switch, to couple said speech transmission line to ground through a capacitor.

* * * * *